United States Patent [19]

Olson

[11] Patent Number: 5,321,112

[45] Date of Patent: Jun. 14, 1994

[54] COPOLYMERIZABLE ULTRAVIOLET RADIATION ABSORBING COMPOUNDS AND POLYMERS MADE THEREWITH

[75] Inventor: David B. Olson, Marine on St. Croix, Minn.

[73] Assignee: Minnesota Mining and Manufacturing Company, St. Paul, Minn.

[21] Appl. No.: 994,778

[22] Filed: Dec. 22, 1992

[51] Int. Cl.$^5$ .............................................. C08G 18/04
[52] U.S. Cl. .................................... 528/75; 528/291; 528/370; 558/402
[58] Field of Search .................... 528/75, 291, 370; 558/402

[56] References Cited

U.S. PATENT DOCUMENTS

| | | | |
|---|---|---|---|
| 4,129,667 | 12/1978 | Lorenz et al. | 427/44 |
| 4,202,836 | 5/1980 | Gruber et al. | 260/465 |
| 4,218,392 | 8/1980 | Lorenz et al. | 260/465 |
| 4,247,475 | 1/1981 | Ching | 260/465 |
| 4,260,680 | 4/1981 | Muramatsu et al. | 435/14 |
| 4,264,719 | 4/1981 | Kameoka et al. | 430/537 |
| 4,366,207 | 12/1982 | Anthony | 428/412 |
| 4,378,194 | 3/1983 | Bandukwalla | 415/49 |
| 4,555,545 | 11/1985 | Kimura et al. | 524/858 |
| 4,555,559 | 11/1985 | Kimura et al. | 528/16 |
| 4,576,870 | 3/1986 | Liebler et al. | 428/515 |
| 4,691,059 | 9/1987 | Mitra et al. | 568/333 |
| 4,831,109 | 5/1989 | Mitra et al. | 528/125 |
| 4,927,944 | 5/1990 | Sit et al. | 558/402 |
| 5,096,781 | 3/1992 | Viera et al. | 428/411.1 |

*Primary Examiner*—John Kight, III
*Assistant Examiner*—R. Johnson
*Attorney, Agent, or Firm*—Gary L. Griswold; Walter N. Kirn; Janice L. Dowdall

[57] ABSTRACT

The invention provides hydroxy-functional cyanoacrylate ultraviolet radiation absorbing compounds. The radiation absorbing compounds can be incorporated into step growth polymers such as polyurethanes, polyesters, and polycarbonates. The invention also provides such polymers having the radiation compound incorporated therein and articles prepared therefrom.

11 Claims, No Drawings

COPOLYMERIZABLE ULTRAVIOLET RADIATION ABSORBING COMPOUNDS AND POLYMERS MADE THEREWITH

FIELD OF THE INVENTION

This invention relates to novel dihydroxy-functional copolymerizable ultraviolet radiation absorbing compounds and polymers prepared therewith. The compounds, which possess at least two primary or secondary aliphatic hydroxyl groups, are capable of being reacted into a step-growth polymer such as a polyurethane, polyester, or polycarbonate polymer.

BACKGROUND OF THE INVENTION

Many applications of plastic materials, especially transparent materials, involve prolonged exposure to ultraviolet (UV) radiation, which can damage or discolor the plastic. A large number of ultraviolet radiation absorbing additives are available, but it is well-known that such additives lose their effectiveness over time because of leaching or because of migration to the plastic surface.

To avoid this loss of effectiveness, UV radiation absorbers which are capable of being copolymerized into the polymer matrix have been developed. Such materials offer the obvious advantage of being incapable of either leaching or blooming, and, thus, maintain their protective function. Efforts to date to synthesize such copolymerizable UV absorbers have focused on ethylenically-unsaturated molecules, often acrylate-functional molecules, which are easily incorporated into acrylate or polyolefin polymers.

Common core molecules which have received widespread attention are esters of 2-cyano-3,3-diaryl acrylic acid, the so-called cyanoacrylates. U.S. Pat. Nos. 4,218,392; 4,202,834; and 4,129,667; (assigned to GAF Corp.) describe acrylate-functional cyanoacrylates. The cyanoacrylates described in these patents feature acrylate groups at, the terminus of the acrylate ester chain which are easily copolymerized with ethylenically-unsaturated monomers such as methyl methacrylate, polyvinyl chloride and polyethylene. A common intermediate in the preparation of the GAF cyanoacrylates is 2-hydroxyethyl 2-cyano-3,3-diphenylacrylate, a monohydroxylate cyanoacrylate.

Patents granted to General Electric Co. (U.S. Pat. Nos. 4,366,207; 4,264,719; 4,260,680; and 4,247,475) describe cyanoacrylate-type UV radiation absorbers which are incorporated into polycarbonate polymers via aromatic phenolic hydroxyl groups. Similarly, U.S. Pat. Nos. 4,555,559 and 4,555,545 (Toshiba Silicone Co.) describe phenolic-functional cyanoacrylates used as stabilizers for polycarbonate resins. U.S. Patent No. 4,576,870 (Rohm GmbH) describes a number of methods of stabilizing polycarbonate resins, including the use of acrylate-functional cyanoacrylates. None of the aforementioned references reveal a means of stabilizing polyurethane or polyester polymers produced by step-growth type polymerizations.

U.S. Pat. No. 4,378,194 (General Motors Corp.) describes urethane paints stabilized against UV radiation by copolymerization of hindered piperidinols into the urethane polymer chain. U.S. Pat. Nos. 4,831,109 and 4,691,059, assigned to the assignee of the present application, both of which are incorporated by reference herein, describe 2-hydroxybenzophenone UV radiation stabilizers for polyurethanes, polyesters and polycarbonates in which two or more aliphatic hydroxyl groups are part of an aliphatic chain pendant from one of the aromatic nuclei. Cyanoacrylate UV radiation absorbers are not disclosed in any of these three patents.

U.S. Pat. No. 5,096,781 (Ciba-Geigy Corp.) discloses unspecified cyanoacrylate-type UV radiation absorbers having at least one quaternary nitrogen moiety in the molecule to impart solubility in water and optionally having from 1 to 3 aliphatic hydroxyl groups in the acrylate ester side chain.

SUMMARY OF THE INVENTION

A need thus exists for a UV radiation absorber which can be incorporated into a step-growth polymer. None of the cited references describe simple, inexpensive dihydroxy-functional cyanoacrylate-type UV radiation absorbers which can be incorporated directly into step-growth type polymer such as a polyurethane, polyester or polycarbonate main chain by copolymerization so as to impart improved UV radiation resistance to the polymer. I have discovered such a dihydroxy-functional cyanoacrylate UV radiation absorber and polymers which incorporate them.

The present invention provides for novel hydroxy-functional cyanoacrylate UV radiation absorbing compounds or monomers of formula (I) which are capable of being copolymerized in a step-growth type polymerization reaction to form a UV radiation resistant (co)-polymer such as a UV radiation resistant polyurethane, polyester, or polycarbonate polymer.

The copolymerizable hydroxy-functional cyanoacrylate UV radiation absorbing compounds of this invention are exemplified by Formula I:

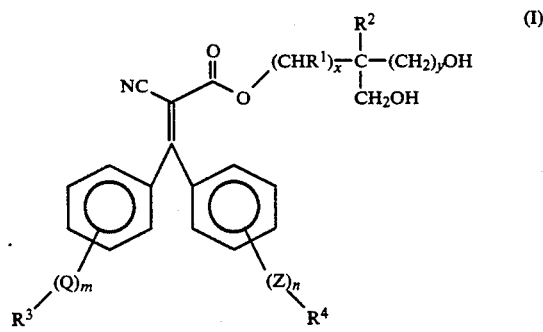

wherein $R^1$ and $R^2$ are monovalent moieties which can be the same or different and each is independently selected from the group consisting of hydrogen and substituted or unsubstituted alkyl, alkoxyalkyl, aryl, aryloxyalkyl, alkoxyaryl, aralkyl and alkaryl groups, wherein $R^1$ and $R^2$ together comprise a total of from about 0 to about 40 carbon atoms or $R^1$ and $R^2$ can together form an aliphatic cyclic structure which comprises 5 to 7 carbon atoms and which can optionally further comprise 1 to 2 non-connected oxygen atoms;

x represents an integer of from 0 to about 20;

y represents an integer of 0 to 1; provided that x and y do not simultaneously represent 0; and $R^3$ and $R^4$ are monovalent moieties which can be the same or different and can represent a total of 0 to ten monovalent substituents on the aromatic rings selected from the group consisting of hydrogen;

halogen (—Cl, —Br, —F); nitrogen-containing groups selected from the group consisting of nitro, primary amine, secondary amine, tertiary amine, amido, and cyano; substituted or unsubstituted alkyl, aryl, alkenyl, aralkyl, alkoxy, aryloxy, aralkyloxy, alkaryloxy, aryloxyalkyl and thioalkyl moieties comprising from about 1 to about 20 carbon atoms and optionally further comprising 1 to about 6 non-connected oxygen and sulfur atoms, wherein said moieties can optionally be substituted by a group selected from the group consisting of halogens and nitrogen-containing groups such as nitro, primary amine, secondary amine, tertiary amine, cyano or amido;

Q and Z are divalent linking species which can be the same or different selected from the group consisting of keto, sulfoxide and sulfone groups;

m is an integer of 0 or 1;

n is an integer of 0 or 1;

The moieties $R^1$ and $R^2$ can each optionally be substituted by a non-proton-donating group (non-nucleophilic group) which preferably is selected from the group consisting of halogen (—Cl, —F, —Br), —NO$_2$, —CN, an aldehyde group, an acyl group comprising from about 1 to about 10 carbon atoms, and an aroyl group comprising from about 6 to about 10 carbon atoms.

The stabilizer compound of the invention can provide UV radiation resistance to a polymer by reaction into the polymer, typically about 1 to about 7 weight percent of stabilizer compound based upon the total weight of the polymer. Alternatively, the stabilizer compound of the invention can be blended with a polymer, typically about 0.5 to about 10 percent by weight, preferably about 0.5 to about 5 percent by weight of stabilizer compound based upon the total weight of the polymer plus the stabilizer compound.

The invention also provides for polymers in which the compound(s) of formula I are incorporated into the polymer via copolymerization. Examples of such polymers include but are not limited to those selected from the group consisting of polyurethane polymers, polyester polymers, and polycarbonate polymers which have the stabilizer compound of the invention incorporated therein, preferably into the backbone.

The invention also provides for films, webs, sheets, filaments, fibers, coatings, support layers, and cast articles prepared from polymers which incorporate the compounds of formula I.

The following definitions are used herein:

"backbone" means main chain of a polymer, exclusive of pendant or end groups;

"pendant" means suspended from the main chain of a polymer and not an end group;

"polyester" means a polymer having structural units linked by ester groupings, obtained by condensation of polycarboxylic acids with polyhydric alcohols;

"polyurethane" means a polymer characterized by a plurality of urethane groups —NHCOO—;

"polycarbonate" means a polyester of carbonic acid, made by the polymeric condensation of carbonic acid or its derivatives with a polyhydric alcohol;

"step growth polymerization" means a multistep reaction for the formation of polymers by chemical reactions such as condensation, addition, and elimination of small molecules;

"cyanoacrylate" means compositions comprising esters of 2-cyano-3,3-diaryl acrylic acid; and "ar" or "aryl" means phenyl, biphenyl, or polynuclear aromatic hydrocarbon groups comprising from about 6 to about 20 carbon atoms and substituted derivatives thereof.

DETAILED DESCRIPTION OF THE INVENTION

The hydroxy-functional cyanoacrylate compound(s) of the invention can be prepared, for instance, by transesterification of a cyanoacrylate ester such as ethyl 3,3-diphenyl-2-cyanoacrylate, available from BASF as UVINUL TM N-35, with a cyclic acetal or ketal of a trihydroxy compound such as glycerol or 2,2-bis(hydroxymethyl)butanol. Acid-catalyzed hydrolysis of the ketal or acetal yields the dihydroxy-substituted cyanoacrylate ester.

A. Cyclic Acetal

Cyclic acetals useful in the present invention are prepared from the reaction of a trihydroxy compound of the general formula II

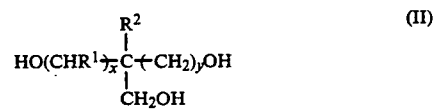

wherein $R^1$, $R^2$, x, and y are as defined above; with an aldehyde or ketone of the general formula III

wherein $R^6$ and $R^7$ are independently selected from the group consisting of H, alkyl, aryl, alkoxyalkyl, aryloxyalkyl, aralkyl, and alkaryl, or $R^6$ and $R^7$ together can form an aliphatic cyclic structure comprising from about 5 to about 7 carbon atoms and which can optionally further comprise 1 to 2 non-connected oxygen atoms, wherein together $R^6$ and $R^7$ can comprise a total of about 0 to about 40 carbon atoms; in the presence of an acid catalyst to convert the aldehyde or ketone to the cyclic acetal or ketal of the formula IV

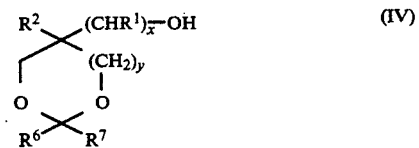

wherein $R^1$, $R^2$, $R^6$, $R^7$, x and y are as defined above.

A variety of trihydroxy compounds may be used for this purpose, including but not limited to those selected from the group consisting of glycerol; 2-methylglycerol; 1,2,3-butanetriol; 1,2,4-butanetriol; 1,2,5-pentanetriol; 1,2,6-hexanetriol; 2-methyl-1,2,3-butanetriol; 2-hydroxymethyl-1,3-propanediol; 2-hydroxymethyl-1,3-butanediol; 2-hydroxymethyl-1,4-butanediol; 2-hydroxymethyl-1,5-pentanediol; 2,2-bis(hydroxymethyl)-3-methylhexanol; 2,2-bis(hydroxymethyl)-3-ethylpentanol; 2,2-bis(hydroxymethyl)butanol; 2-hydroxymethyl-2-methyl-1,3-propanediol; 2-hydroxymethyl-2-methyl-1,3-butanediol; 1-phenylglycerol; 2-phenylglycerol; 2-hydroxymethyl-1-phenyl-1,3-propanediol;

2-hydroxymethyl-2-phenyl-1,3-propanediol; and mixtures thereof. Preferably, the triol is selected from the group consisting of glycerol, 2-hydroxymethyl-2-methyl-1,3-propanediol, 2,2-bis(hydroxymethyl)butanol, and mixtures thereof, because of their ease of formation of cyclic acetals or ketals and their commercial availability.

The aldehyde of the general formula $R^6C(=O)H$, wherein $R^6$ is as previously defined, needed for preparing the cyclic acetal is preferably selected from the group consisting of formaldehyde, acetaldehyde, propionaldehyde, isobutyraldehyde, chloral, benzaldehyde, o-nitrobenzadehyde, m-nitrobenzadehyde, p-nitrobenzaldehyde, m-chlorobenzaldehyde, anisaldehyde, fufural, and mixtures thereof.

To prepare a cyclic ketal, the carbonyl component is a ketone of the general formula $R^6C(=O)R^7$. Preferred ketones according to the present invention are selected from the group consisting of acetone, methyl ethyl ketone, methyl isobutyl ketone, cyclopentanone, cyclohexanone, 3-methylcyclohexanone, acetophenone, benzophenone, and mixtures thereof. Methyl ethyl ketone is the most preferred ketone due to its ready formation of ketals with triols and its facile removal subsequent to ketal hydrolysis.

The method of synthesis of a cyclic acetal or ketal from a 1,2-diol or 1,3-diol and an aldehyde or ketone by acid catalysis is known in the art. The cyclization is usually brought about by treating the hydroxy compound with the aldehyde or ketone in the presence of an acid catalyst such as hydrogen chloride (or hydrochloric acid), sulfuric acid, perchloric acid, p-toluenesulfonic acid, or zinc chloride. The reaction may be carried out in the absence of a solvent, but according to the present invention an inert diluent such as dimethylformamide (DMF), dioxane, ether, benzene, toluene or petroleum ether is preferred. By appropriate choice of this diluent, the water formed in the reaction can be removed by distillation. When the reaction reaches completion, the mixture may be neutralized with a weak base such as sodium acetate and dried with a conventional drying agent such as anhydrous sodium sulfate, before isolating the cyclic acetal or ketal by an isolation method such as one of those known in the art.

B. Cyanoacrylate Ester

Examples of cyanoacrylate ester species which can be reacted with a cyclic acetal or ketal as described above include but are not limited to those selected from the group consisting of ethyl 3,3-diphenyl-2-cyanoacrylate and 2-ethylhexyl 3,3-diphenyl-2-cyanoacrylate, available from BASF as UVINUL TM N-35 and N-539, respectively. These esters are typically produced by the condensation reaction of benzophenone and cyanoacetate esters via the Knoevenagel condensation reaction.

C. Transesterification Reaction

Cyclic acetals and ketals prepared from trihydroxy compounds, as described above, contain a free primary hydroxyl group. Compounds containing a free primary hydroxyl group will undergo ester exchange or transesterification reactions with a carboxylic ester under conditions in which the newly-formed alcohol moiety is volatile and is removed from the reaction mixture as the reaction progresses (see "Basic Principles of Organic Chemistry", 2nd Edition, J. D. Roberts and M. C. Caserio, W. A. Benjamin, Menlo Park, Calif. (1977), p. 821, incorporated by reference herein).

Typically, the starting ester is dissolved in a suitable organic solvent and treated with a relatively strong base such as an alkali-metal salt of an alcohol (sodium methoxide, potassium ethoxide, etc.) under reflux in the presence of the new alcohol to be exchanged (in the case of the present invention, the cyclic acetal or ketal bearing a free primary hydroxyl group). Solvent is slowly distilled from the reaction mixture, at which time the more volatile alcohol, initially present in the starting ester, is removed from the reaction concurrent with solvent distillation. Under circumstances where the exchanging alcohol is also somewhat volatile or susceptible to co-distillation, it may be used in large excess to ensure that the ester exchange reaction goes to completion.

D. Hydrolysis of the Acetal or Ketal

The cyclic acetal or ketal ester resulting from the above-described ester exchange can now be cleaved by acidic hydrolysis. Typically, the acetal or ketal is dissolved in a methanol/water mixture and the pH is adjusted to about pH=1 to about pH=2 by addition of a suitable acid such as hydrochloric acid. Brief heating or refluxing of the mixture results in essentially quantitative cleavage of the cyclic ketal or acetal group to produce the polymerizable dihydroxy compounds of formula (I) of the present invention, which can be isolated by conventional means, including distillation and crystallization techniques.

Representative examples of stabilizer dihydroxy compounds of formula (I) include those selected from the group consisting of:

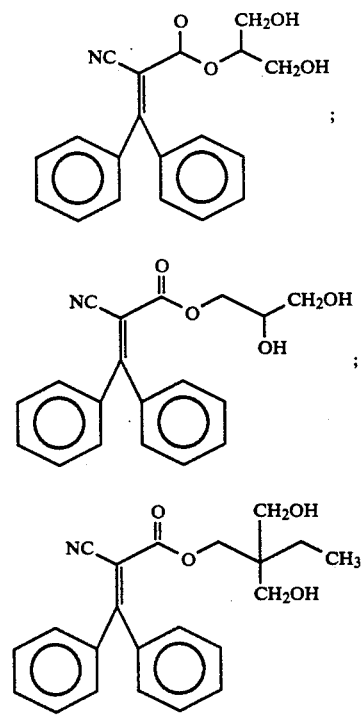

and

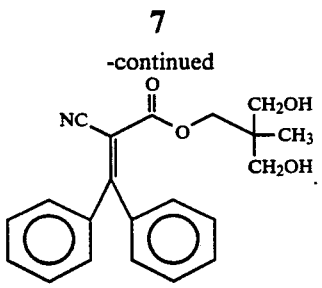

E. Polymeric Compositions Comprising Dihydroxy Cyanoacrylates Compounds

The dihydroxy ultraviolet stabilizer compound(s) of formula (I) can be incorporated into typical step-growth (co)polymers, e.g., including but not limited to those selected from the group consisting of polyesters, polycarbonates, and polyurethanes. Generally, the stabilizer compound is mixed with other polyols such as diols, triols, etc. and cocondensed with compounds selected from the group consisting of dicarboxylic acids including but not limited to those selected from the group consisting of phthalic acid, terephthalic acid, adipic acid, maleic acid, malonic acid, glutaric acid, oxalic acid, succinic acid, malic acid and their esters and their acid chlorides; phosgene; bischloroformates including but not limited to those selected from the group consisting of 1,2-ethanedioldichloroformate, 1,4-butanedioldichloroformate, 1,6-hexanedioldichloroformate, 1,3-dichloroformyloxybenzene, 1,4-dichloroformyloxybenzene, and bisphenol-A-dichloroformate, and mixtures thereof; and diisocyanates including but not limited to those selected from the group consisting of toluene diisocyanate, hexamethylene diisocyanate, and tetramethylene diisocyanate, and mixtures thereof; to produce stabilizer-incorporated polymers. Synthetic techniques for preparing step-growth polymers in general from hydroxy compounds are known in the art and variations of a number of standard methods may be used to prepare the novel polymers of the invention (see "Principles of Polymerization" by G. Odian, 2nd Ed., John Wiley and Sons, N.Y. (1981), incorporated by reference herein.

Multifunctional monomers such as those containing acid, acid anhydride, acid chloride ester, and/or isocyanate functionality can undergo condensation polymerization with the ultraviolet stabilizing dihydroxy compounds of the present invention to produce (co)polymers with improved weathering characteristics. The term "multifunctional monomer" as used herein refers to monomers containing two or more functional groups. In addition, mixtures of the compound(s) of formula (I) with other polyhydroxy compound(s) and the multifunctional monomer(s) can undergo polymerization to prepare polyester, polycarbonate, or polyurethane polymers, or mixtures thereof. The ratio of the amounts of stabilizing dihydroxy-functional cyanoacrylate monomer to the amount of added polyol may be varied during polymer syntheses to incorporate different amounts of stabilizing moieties into the (co)polymer. Preferably, about 1% to about 7% by weight of the stabilizing dihydroxy-functional cyanoacrylate compound is incorporated into the final polymer. The copolymers formed may be linear or branched.

A UV radiation stabilized polyester of the present invention can be provided by the reaction of a mixture comprising:

(a) about 50 mole percent of a dicarboxylic acid selected from the group consisting of aliphatic dicarboxylic acids, aromatic dicarboxylic acids, and mixtures thereof, wherein the dicarboxylic acid comprises from about 2 to about 22 carbon atoms and optionally comprising about 1 to 3 non-connecting heteroatoms selected from the group consisting of S, N and O;

(b) about 0 to about 50 mole percent, preferably about 40 to about 49.995 mole percent, of a low molecular weight glycol comprising from about 2 to about 20 carbon atoms, including but not limited to those selected from the group consisting of ethylene glycol, 1,4-butanediol, 1,6-hexanediol, 1,4-dimethylolcyclohexane, and dimethylol molecules containing residues selected from the group consisting of aliphatic, aromatic, cycloaliphatic and heterocyclic residues; and (c) about 0.005 to about 50 mole percent, preferably about 0.005 to about 10 mole percent, of a dihydroxy compound of formula (I);

wherein (a), (b), and (c) together comprise 100 mole percent.

A UV radiation stabilized polyurethane according to this invention can be provided by reaction of a mixture comprising:

(a) about 50 mole percent of a diisocyanate selected from the group consisting of aliphatic diisocyanates, aromatic diisocyanates, and mixtures thereof, comprising from about 3 to about 22 carbon atoms and optionally comprising about 1 to about 3 non-connected heteroatoms selected from the group consisting of N, S, and O and combinations thereof;

(b) about 0 to about 50 mole percent, preferably about 40 to about 49.995 mole percent, of a low molecular weight glycol having from about 2 to about 20 carbon atoms, such as ethylene glycol, 1,4-butanediol, 1,6-hexanediol, 1,4-dimethylolcyclohexane, or other dimethylol molecules containing aliphatic, aromatic, cycloaliphatic or heterocyclic residues; and (c) about 0.005 to about 50 mole percent, preferably about 0.005 to about 10 mole percent, of a dihydroxy compound of formula (I);

wherein (a), (b), and (c) together comprise 100 mole percent.

A UV radiation stabilized polycarbonate according to this invention can be provided by reaction of a mixture comprising:

(a) about 50 mole percent of a compound selected from the group consisting of phosgene, an aromatic bis-chloroformate comprising from about 3 to about 22 carbon atoms; an aliphatic bis-chloroformate comprising from about 3 to about 22 carbon atoms; and mixtures thereof;

(b) about 0 to about 50 mole percent, preferably about 40 to about 49.995 mole percent, of a low molecular weight glycol comprising from about 2 to about 20 carbon atoms, including but not limited to those selected from the group consisting of ethylene glycol, 1,4-butanediol, 1,6-hexanediol, 1,4-dimethylolcyclohexane, or other dimethylol molecules containing aliphatic, aromatic, cycloaliphatic or heterocyclic residues, or a dihydroxy aromatic compound including but not limited to those selected from the group consisting of resorcinol, catechol, hydroquinone, 4,4'-dihydroxybiphenyl, 4,4'-dihydroxydiphenylmethane (bisphenol A), and mixtures thereof; and (c) about 0.005 to about 50 mole percent, preferably about 0.005 to about 10 mole percent, of a dihydroxy compound of formula (I);

wherein (a), (b), and (c) together comprise 100 mole percent.

A catalyst may optionally be used in the preparation of the step-growth polymers having the stabilizing compound of the invention incorporated therein to facilitate the polymerization. Useful catalysts are those typically used to catalyze step growth polymerizations and the amount of catalyst would vary depending upon the polymer to be formed. One skilled in the art would be able to select an appropriate catalyst and amount thereof to facilitate a step growth polymerization. A useful catalyst for preparing a polyester would be a protonic acid or a Lewis acid such as sulfuric acid or zinc chloride. Dibutylin dilaurate is a useful catalyst for preparing polyurethanes. Useful catalysts for preparing polycarbonates include bases such as pyridine, sodium hydroxide, lithium hydroxide, and the like.

Polymers of the present invention are useful for a number of articles including but not limited to use as fibers, protective films, supports for other materials and as stand alone cast objects and are particularly resistant to UV radiation and sunlight degradation. Polymer films incorporating the polymeric UV radiation stabilizers of this invention show good processability and, when compared with polymers not containing the UV radiation stabilizers in accelerated weathering test, show superior color stability, mechanical performance and reduced crack formation. Polymer films incorporating the hydroxy-functional cyanoacrylate UV radiation absorbing compounds of the invention are also useful as protective elements in layered polymeric film constructions.

The present invention also provides for physical blends of the polymers of the invention with compatible monomers and/or polymers to provide UV stabilized materials.

The invention will be more fully appreciated with reference to the following non-limiting Examples. All parts, percentages, ratios, etc. in the Examples and the rest of the Specification are by weight unless indicated otherwise.

EXAMPLE 1

Ketal Synthesis

A ketal of formula (IV) ($R^1=H$, $R^2=R^7=-CH_2CH_3$, $R^6=-CH_3$, $x=y=1$) was prepared as follows: 201 g trimethylolpropane, 216 g methyl ethyl ketone, 3.0 g p-toluenesulfonic acid and 150 g of toluene were heated to reflux and stirred in a 1 liter 3-neck flask equipped with a Dean-Stark water trap, a thermometer and a condenser. After 6 hours of reflux (pot temperature=95°–105° C.), gas chromatographic analysis of the reaction mixture showed that 8% of the triol remained. The reaction mixture was cooled to room temperature, then most of the solvent was removed under aspirator vacuum with heating until the pot temperature reached 100° C. The residual oil was distilled through a short Vigreux column to yield 227 g of a clear liquid, boiling point 105°–115° C. at 1.0–1.5 mm Hg.

EXAMPLE 2

Dihydroxy-Functional UV Stabilizer Synthesis

A dihydroxy UV radiation stabilizer of formula (I) ($R^1=R^2=R^3=R^4=H$, $x=1$, $y=0$) was prepared as follows: 544 g ethyl 2-cyano-3,3-diphenylacrylate (BASF) was mixed with 2 liters of xylenes in a 5-filter 3-neck flask equipped with a heating mantle, mechanical stirrer, thermometer, addition funnel, Dean-Stark trap and a condenser. Sodium methoxide (1.0 g) was added and the stirred mixture was heated to reflux. A total of 660 g solketal (2,2-dimethyl-1,3-dioxolane-4-methanol, Aldrich) was added dropwise over a 12-hour period. The contents of the Dean-Stark trap were removed periodically and found to be a mixture of solvent and ethanol, the product of the ester exchange reaction. A total of 1500 ml of solvent, ethanol and ketal was removed in this manner, and the removed solvent was replaced with fresh xylenes. The course of the reaction was followed by standard gas chromatographic methods.

When all of the starting ester had been converted, the solvent was stripped under vacuum and the crude residual oil was taken up in a mixture of 700 ml water and 1500 ml methanol. The stirred solution was treated with approximately 15 ml concentrated HCl to bring the pH of the mixture to between 1 and 2, after which the mixture was heated to reflux for two hours. Complete hydrolysis of the ketal was shown by standard gas chromatographic methods and thin layer chromatographic techniques.

The methanol-water solvent was removed under vacuum and the residue was partitioned between 1 liter of methylene chloride and 1 liter of water containing 50 g sodium bicarbonate. The organic layer was separated and washed twice with 1 liter of water to remove residual methyl ethyl ketone and triol, then dried over anhydrous magnesium sulfate. Removal of the solvent under vacuum gave 550 g of a light yellow oil (85% overall yield). Gas chromatographic analysis showed the oil to be 86% desired diol and 10% of an isomeric dihydroxy diol (formula (I), ($R^1=R^2=R_3R^4-H$, $x=1$, $y=0$)), with less than 0.3% residual glycerol.

EXAMPLE 3

Dihydroxy-Functional UV Stabilizer Synthesis

A solution of 276 g ethyl 3,3-diphenyl-2-cyanoacrylate (BASF), 200 g trimethylol propane ketal (prepared according to Example 1) and 5.0 g sodium methoxide in 560 g xylenes was stirred and heated to reflux in a 2-liter 3-neck flask equipped with a heating mantle, mechanical stirrer, thermometer, Dean-Stark trap, and condenser. Reflux was continued for 13 hours, with continual removal of ethanol via the trap and replacement of removed xylenes. Gas chromatographic analysis of the reaction mixture showed approximately 95% completion of the transesterification. The mixture was cooled to room temperature and the xylenes were stripped under vacuum while the temperature was kept under 100° C. The residues were treated with 250 ml water, 130 ml methanol and 13.0 g concentrated HCl, and the resultant mixture was refluxed for 5 hours, after which methanol was distilled until the pot temperature reached 100° C. The residue was taken up in 1 liter of isopropyl acetate and washed thoroughly with water. Removal of isopropyl acetate gave 336 g dense white solid. Gas chromatographic analysis showed the solid to be 97% pure, with less than 0.2% residual triol. A C$^{13}$ NMR spectrum of the product confirmed the structure as formula I ($R_1=R_3=R_4=$—H, $R_2=$—$C_2H_5$, $x=y=1$).

EXAMPLE 4

Polyester Polyurethane Urea Containing Dihydroxy-Functional UV Stabilizer

A solution of 177.92 g Ruco S-1035-110 Polyester (a mixed aliphatic/aromatic polyester polyol, number average molecular weight approximately 1000, from Ruco Polymer Corp.), 27.04 g dimethylol propionic acid (DMPA), 163.64 g hydrogenated diphenylmethane diisocyanate ($H_{12}MDI$), 16.68 g dihydroxy-functional UV stabilizer of Example 3 (4.1% by total weight of polyester, diisocyanate and UV stabilizer) and 2 drops of dibutyltin dilaurate in 148.74 g methyl ethyl ketone (MEK) was stirred and heated to reflux for three hours to obtain a polyurethane prepolymer. A total of 200 g of the prepolymer was then treated with 380 g chilled deionized water, 7.35 g triethylamine and 6.16 g 1,3-diaminopentane (DAMP) in a Gifford-Wood mixer to obtain a translucent bluish emulsion. Excess MEK was removed under vacuum to obtain a polyurethane coating material containing 36.6% solids and a Brookfield viscosity of 728 cps.

EXAMPLE 5

Weathering of Polymers

The waterborne polyester polyurethane urea of Example 4 was bar-coated onto an industry-standard automobile paint sample (a two-part urethane paint) on an automobile steel panel which was subsequently dried in an oven at 100° C. for 5 minutes then at 200° C. for one minute. The samples were exposed to both outdoor and accelerated weathering along with control samples. Control samples comprised the polyester polyurethane urea clear coat with no copolymerized UV radiation absorbing compound therein.

Outdoor weathering tests were conducted according to ASTM G-7 methods (Annual Book of ASTM Standards, Vol. 6.01), incorporated by reference herein. Test panels measuring 11×28 cm were mounted in racks facing south at 5° (Florida) and 45° (Arizona) from horizontal and exposed to direct weathering for 24 months. Evaluation of samples and controls was by visual inspection, at 12-month intervals.

Indoor accelerated weathering tests were conducted according to ASTM G-23, Type E methods (Annual Book of ASTM Standards, Vol. 6.01), incorporated by reference herein. Test panels measuring 11×11 cm were mounted in an Atlas Electric Devices open flame carbon are (filtered by Corex D glass panes) weatherometer, model XW and exposed to cycles of 102 minutes of light at 63° C. (black panel) followed by 18 minutes of light plus water spray, for a total of 1000 hours. Samples were also tested by exposure in an Atlas Electric Devices twin enclosed carbon arc (filtered by 9200-PX borosilicate globes) weatherometer, model DMC, under the above conditions and time. In a third test, panels were exposed to a single carbon arc filtered by a 9200-PX borosilicate globe in an Atlas Electric Devices Fade-O-Meter ™ weatherometer under continuous light at 63° C. (black panel) for 1000 hours.

Comparison of test panels to controls, when tested under each of the conditions noted above, showed that paint samples protected with a clear coating of the waterborne polyester polyurethane of Example 4 containing 4.1% of the hydroxyfunctional cyanoacrylate UV radiation absorbing compound of Example 3 exhibited noticeably less yellowing and fewer cracks as compared to the control samples.

While this invention has been described in connection with specific embodiments, it should be understood that it is capable of further modification. The claims herein are intended to cover those variations which one skilled in the art would recognize as the chemical equivalent of what has been described herein.

I claim:

1. An ultraviolet radiation absorbing compound comprising a compound of the formula I

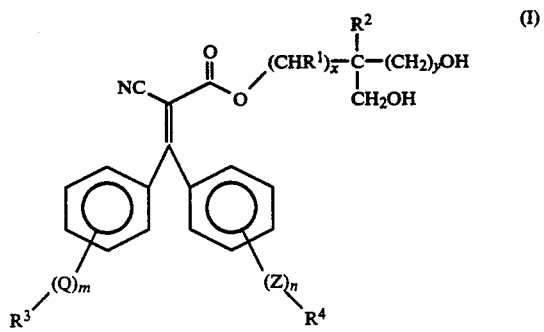

wherein
- $R_1$ and $R_2$ are the same or different and each is selected from the group consisting of hydrogen and substituted or unsubstituted alkyl, alkoxyalkyl, aryl, aryloxyalkyl, alkoxyaryl, aralkyl, and alkaryl groups, or $R_1$ and $R_2$ together form an aliphatic cyclic structure which comprises 5 to 7 carbon atoms and which can optionally further comprise 1 to 2 non-connected oxygen atoms, wherein $R_1$ and $R_2$ together can comprise a total of from 0 to about 40 carbon atoms;
- x represents an integer of from 0 to about 20;
- y represents an integer of 0 to 1; provided that x and y do not simultaneously represent 0; and
- $R_3$ and $R_4$ are monovalent moieties which can be the same or different and represent a total of 0 to 10 monovalent substituents on the aromatic rings selected from the group consisting of hydrogen; halogen nitrogen-containing groups; substituted or unsubstituted alkyl, aryl, alkenyl, aralkyl, alkoxy, aryloxy, aralkyloxy, alkaryloxy, aryloxyalkyl and thioalkyl moieties comprising from abut 1 to abut 20 carbon atoms and optionally further comprising about 1 to about 6 non-connected oxygen and sulfur atoms, wherein said moieties can optionally be substituted by halogen or a nitrogen-containing group;
- Q and Z are divalent linking species which can be the same or different selected from the group consisting of keto, sulfoxide, and sulfone groups;
- m represents an integer of 0 or 1; and
- n represents an integer of 0 or 1.

2. The ultraviolet radiation absorbing compound of claim 1 wherein said compound is selected from the group consisting of:

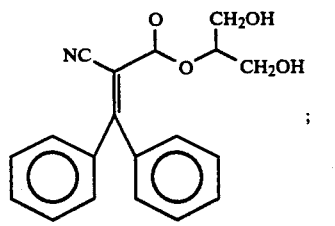

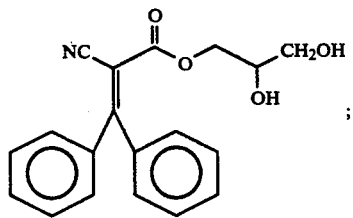

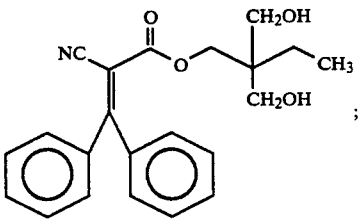

and

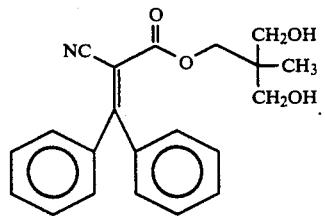

3. A UV radiation stabilized comprising a polyester having the ultraviolet radiation absorbing compound of claim 1 incorporated therein.

4. A UV radiation stabilized material comprising a polyurethane having the compound of claim 1 incorporated therein.

5. A UV radiation stabilized material comprising a polycarbonate having the compound of claim 1 incorporated therein.

6. An ultraviolet radiation stabilized polyester comprising the reaction product of:
 (a) about 50 mole percent of a dicarboxylic acid;
 (b) about 0 to about 50 mole percent of a glycol comprising from about 2 to about 20 carbon atoms; and
 (c) about 0.005 to about 50 mole percent of the dihydroxy compound of claim 1; wherein
 (a), (b), (c) together comprises 100 mole percent.

7. An ultraviolet radiation stabilized polyurethane comprising the reaction product of:
 (a) about 50 mole percent of a diisocyanate;
 (b) about 0 to about 50 mole percent of a glycol comprising from about 2 to about 20 carbon atoms; and
 (c) about 0.005 to about 50 mole percent of the dihydroxy compound of claim 1; wherein
 (a), (b), and (c) together comprises 100 mole percent.

8. An ultraviolet radiation stabilized polycarbonate comprising the reaction product of:
 (a) about 50 mole percent of a compound selected from the group consisting of phosgene, an aromatic bis-chloroformate comprising from about 3 to about 22 carbon atoms; an aliphatic bis-chloroformate comprising from about 3 to about 22 carbon atoms; and mixtures thereof;
 (b) about 0 to about 50 mole percent glycol comprising from about 2 to about 20 carbon atoms; dimethylol molecules containing aliphatic, aromatic, cycloaliphatic or heterocyclic residues; dihydroxy aromatic compounds; and mixtures thereof; and
 (c) about 0.005 to about 50 mole percent of the compound of claim 1; wherein
 (a), (b), and (c) together comprise 100 mole percent.

9. An article selected from the group consisting of fibers, protective films, supports, and casting objects, comprising the polymer of claim 3.

10. An article selected from the group consisting of fibers, protective films, supports and cast objects, comprising the polymer of claim 4.

11. An article selected from the group consisting of fibers, protective films, supports, and cast objects, comprising the polymer of claim 5.

* * * * *

UNITED STATES PATENT AND TRADEMARK OFFICE
CERTIFICATE OF CORRECTION

PATENT NO. : 5,321,112
DATED : June 14, 1994
INVENTOR(S) : David B. Olson

It is certified that error appears in the above-indentified patent and that said Letters Patent is hereby corrected as shown below:

Column 5, line 13 "o-nitrobenzadehyde, m-nirtobenzadehyde," should read --o-nitrobenzaldehyde, m-nitrobenzaldehyde,--.

Column 10, line 42 "(formula (I), ($R^1 = R^2 = R_3 R^4 -$ H, x = 1, y = 0))" should read --(formula (I), ($R^1 = R^2 = R_3 = R^4 -$ H, x = 1, y = 0))--.

Column 11, line 53 "carbon are (filtered" should read --carbon arc (filtered--.

Signed and Sealed this

Fourth Day of April, 1995

Attest:

BRUCE LEHMAN

Attesting Officer    Commissioner of Patents and Trademarks